(12) United States Patent
Carolan et al.

(10) Patent No.: US 7,556,675 B2
(45) Date of Patent: Jul. 7, 2009

(54) FEED GAS CONTAMINANT CONTROL IN ION TRANSPORT MEMBRANE SYSTEMS

(75) Inventors: Michael Francis Carolan, Allentown, PA (US); Eric Minford, Laurys Station, PA (US); William Emil Waldron, Whitehall, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 532 days.

(21) Appl. No.: 11/247,504

(22) Filed: Oct. 11, 2005

(65) Prior Publication Data
US 2007/0079703 A1 Apr. 12, 2007

(51) Int. Cl.
*B01D 53/22* (2006.01)
(52) U.S. Cl. .............................. 96/7; 96/4; 96/9; 96/11; 95/45; 95/54; 423/579; 423/648.1; 423/418.2; 423/437.1; 422/239; 422/241; 502/4; 205/634
(58) Field of Classification Search .................. 95/45, 95/54; 96/4, 7, 9, 11; 423/579, 648.1, 418.2, 423/437.1; 422/239, 240, 241; 502/4; 205/634; 518/705; 138/145, 146
See application file for complete search history.

(56) References Cited

U.S. PATENT DOCUMENTS

| | | | | |
|---|---|---|---|---|
| 4,235,799 A | * | 11/1980 | Wentworth et al. | ......... 518/706 |
| 4,659,540 A | * | 4/1987 | Cheng et al. | ................. 376/417 |
| 4,791,079 A | | 12/1988 | Hazbun | |
| 5,254,318 A | | 10/1993 | Williams et al. | |
| 5,306,411 A | | 4/1994 | Mazanec et al. | |
| 5,356,728 A | | 10/1994 | Balachandran et al. | |
| 5,405,525 A | | 4/1995 | Heyse et al. | |
| 5,451,384 A | * | 9/1995 | Carr | ............................ 423/210 |
| 5,820,655 A | | 10/1998 | Gottzmann et al. | |

(Continued)

FOREIGN PATENT DOCUMENTS

DE    100 56 787 A 1    5/2002

(Continued)

OTHER PUBLICATIONS

U.S. Appl. No. 10/635,695, filed Aug. 6, 2003, Stein, et al.

(Continued)

*Primary Examiner*—Jason M Greene
(74) *Attorney, Agent, or Firm*—Keith D. Gourley

(57) ABSTRACT

Ion transport membrane oxidation system comprising an enclosure having an interior and an interior surface, inlet piping having an internal surface and adapted to introduce a heated feed gas into the interior of the enclosure, and outlet piping adapted to withdraw a product gas from the interior of the enclosure; one or more planar ion transport membrane modules disposed in the interior of the enclosure, each membrane module comprising mixed metal oxide material; and a preheater adapted to heat a feed gas to provide the heated feed gas to the inlet piping, wherein the preheater comprises an interior surface. Any of the interior surfaces of the enclosure, the inlet piping, and the preheater may be lined with a copper-containing metal lining. Alternatively, any of the interior surfaces of the inlet piping and the preheater may be lined with a copper-containing metal lining and the enclosure may comprise copper.

25 Claims, 1 Drawing Sheet

U.S. PATENT DOCUMENTS

| | | |
|---|---|---|
| 5,980,840 A | 11/1999 | Kleefisch et al. |
| 6,110,979 A | 8/2000 | Nataraj et al. |
| 6,139,810 A | 10/2000 | Gottzmann et al. |
| 6,153,163 A | 11/2000 | Prasad et al. |
| 6,402,988 B1 | 6/2002 | Gottzmann et al. |
| 6,403,041 B1 | 6/2002 | Takahashi et al. |
| 6,492,290 B1 * | 12/2002 | Dyer et al. .................... 96/11 |
| 6,692,838 B2 | 2/2004 | Ramanarayanan et al. |
| 6,737,175 B2 | 5/2004 | Ramanarayanan et al. |
| 2003/0039601 A1 | 2/2003 | Halvorson et al. |
| 2005/0031531 A1 * | 2/2005 | Stein et al. .................. 423/579 |

FOREIGN PATENT DOCUMENTS

| | | |
|---|---|---|
| EP | 1 504 811 A | 2/2005 |
| EP | 1 676 624 A | 7/2006 |
| EP | 1 676 811 A | 7/2006 |

OTHER PUBLICATIONS

Tsia, Chung-Yi, "Perovskite Dense Membane Reactors For The Partial Oxidation Of Methane To Synthesis Gas", A Dissertation submitted to the faculty of the Worcester Polytechnic Institute in partial fulfillment of the requirements for the Degree of Doctor of Philosophy in Chemical Engineering, May 1996, pp. 86-93.

* cited by examiner

FEED GAS CONTAMINANT CONTROL IN ION TRANSPORT MEMBRANE SYSTEMS

STATEMENT REGARDING FEDERALLY SPONSORED RESEARCH OR DEVELOPMENT

This invention was made with government support under Contract Number DE-FC26-97FT96052 between Air Products and Chemicals, Inc. and the U.S. Department of Energy. The Government has certain rights to this invention.

BACKGROUND OF THE INVENTION

The permeation of oxygen ions through ceramic ion transport membranes is the basis for a variety of gas separation devices and oxidation reactor systems operating at high temperatures in which permeated oxygen is recovered on the permeate side as a high purity oxygen product or is reacted on the permeate side with oxidizable compounds to form oxidized or partially oxidized products. The practical application of these gas separation devices and oxidation reactor systems requires membrane assemblies having large surface areas, gas distribution systems to contact feed gas with the feed sides of the membranes, and product collection systems to withdraw product gas from the permeate sides of the membranes. These membrane assemblies may comprise a large number of individual membranes arranged and assembled into modules having appropriate gas flow piping to introduce feed gas into the modules and withdraw product gas from the modules.

Ion transport membranes may be fabricated in either planar or tubular configurations. In the planar configuration, multiple flat ceramic plates are fabricated and assembled into stacks or modules having piping systems to pass feed gas over the planar membranes and to withdraw product gas from the permeate side of the planar membranes. In tubular configurations, multiple ceramic tubes may be arranged in bayonet or shell-and-tube configurations with appropriate tube sheet assemblies to isolate the feed and permeate sides of the multiple tubes.

The individual membranes used in planar or tubular module configurations typically comprise very thin layers of active membrane material supported on material having large pores or channels that allow gas flow to and from the surfaces of the active membrane layers. Each active ceramic membrane operates in a highly-reactive chemical and electrochemical environment, and the presence of certain contaminants in the hot feed gas in this environment may adversely affect the membrane stoichiometry and operating efficiency. The adverse results may differ depending on whether the membrane is operated in gas separation or oxidation service. The potential operating problems caused by these phenomena can have a significant negative impact on the purity of recovered products and on membrane operating life.

The solid ion-conducting metallic oxide materials used in these membrane modules may degrade in the presence of volatile gas-phase contaminants at the high operating temperatures required to effect ion conduction, thereby reducing the ability of the membranes to conduct or permeate oxygen ions. Because of this potential problem, there is a need in the art for methods to control certain contaminants in the feed gas to the membrane modules and in reactive gases within the membrane modules to ensure the successful operation of ion-conducting metallic oxide membrane systems. These needs are addressed by embodiments of the present invention as disclosed below and defined by the claims that follow.

BRIEF SUMMARY OF THE INVENTION

An embodiment of the invention is an ion transport membrane oxidation system comprising
(a) an enclosure having an interior and an interior surface, inlet piping having an internal surface and adapted to introduce a heated feed gas into the interior of the enclosure, and outlet piping adapted to withdraw a product gas from the interior of the enclosure;
(b) one or more planar ion transport membrane modules disposed in the interior of the enclosure, each membrane module comprising mixed metal oxide material; and
(c) a preheater adapted to heat a feed gas to provide the heated feed gas to the inlet piping of the enclosure, wherein the preheater comprises an interior surface;

wherein either
(1) any of the interior surfaces of the enclosure, the inlet piping, and the preheater are lined with a copper-containing metal lining, or
(2) any of the interior surfaces of the inlet piping and the preheater are lined with a copper-containing metal lining, and the enclosure comprises copper.

In this embodiment, each membrane module may have an interior region and an exterior region, and wherein the inlet and the outlet of the vessel may be in flow communication with the exterior region of each membrane module.

The copper-containing metal lining may comprise greater than about 99 weight % copper. Alternatively or additionally, the copper-containing metal lining may comprise less than about 0.0005 weight % oxygen. The type of copper-containing metal lining may be selected from the group consisting of electroplating, foil, cladding, tubing, and pipe. The system may further comprise refractory material disposed between the copper-containing metal lining and any of the interior surfaces of the enclosure and the inlet piping. Any of the enclosure, the inlet piping, and the preheater comprise one or more elements may be selected from the group consisting of nickel, silicon, and tungsten.

In this embodiment, the enclosure may be a flow containment duct that surrounds the one or more planar ion transport membrane modules and wherein the flow containment duct is disposed in the interior of a pressure vessel. Alternatively, the enclosure may be a pressure vessel that surrounds the one or more planar ion transport membrane.

The mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Copper, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral. More specifically, the mixed conducting metal oxide material may have the general stoichiometric composition $(La_xCa_{1-x})_w FeO_{3-\delta}$ wherein $1.0 > x > 0.5$, $1.1 \geq w > 1.0$, and $\delta$ is a number which renders the composition charge neutral.

Another embodiment of the invention relates to a process for generating synthesis gas comprising
(a) providing an ion transport membrane oxidation system including
(1) an enclosure having an interior and an interior surface, inlet piping having an internal surface and adapted to introduce a heated feed gas into the interior of the enclosure, outlet piping adapted to withdraw a product gas from the interior of the enclosure, and a preheater adapted to heat a feed gas to provide the heated feed gas to the inlet piping of the enclosure, wherein the preheater has an interior surface; and (2) one or more planar ion transport membrane modules disposed in the interior of the enclosure, each membrane module comprising mixed metal oxide material;

wherein either (3) any of the interior surfaces of the enclosure, the inlet piping, and the preheater are lined with a copper-containing metal lining, or (4) any of the interior surfaces of the inlet piping and the preheater are lined with a copper-containing metal lining, and the enclosure comprises copper.

(b) introducing a heated oxygen-containing gas into the interior region of each membrane module, introducing a hydrocarbon-containing feed gas into the preheater, withdrawing a preheated hydrocarbon-containing feed gas from the preheater, and introducing the preheated hydrocarbon-containing feed gas into the exterior region of each membrane module; and (c) withdrawing a synthesis gas product from the interior of the enclosure via the outlet piping.

The hydrocarbon-containing feed gas may comprise at least methane and water and optionally may comprise any of hydrogen, carbon monoxide, and carbon dioxide. The hydrocarbon-containing feed gas may be pre-reformed natural gas. The synthesis gas may comprise at least hydrogen, carbon monoxide, and carbon dioxide. The feed gas may be heated in the feed gas preheater to a temperature in the range of 600 to 1100° C.

In this embodiment, the copper-containing metal lining may comprise greater than about 99 weight % copper. Additionally or alternatively, the copper-containing metal lining may comprise less than about 0.0005 weight % oxygen. The type of copper-containing metal lining may be selected from the group consisting of electroplating, foil, cladding, tubing, and pipe. Refractory material may be disposed between the copper-containing metal lining and any of the interior surfaces of the enclosure and the inlet piping. Any of the vessel, the inlet piping, and the preheater may comprise one or more elements selected from the group consisting of nickel, silicon, and tungsten.

The enclosure may be a flow containment duct that surrounds the one or more planar ion transport membrane modules in which the flow containment duct is disposed in the interior of a pressure vessel. Alternatively, the enclosure may be a pressure vessel that surrounds the one or more planar ion transport membrane modules.

The mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Copper, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral. More specifically, the mixed conducting metal oxide material may have the general stoichiometric composition $(La_xCa_{1-x})_w FeO_{3-\delta}$ wherein $1.0 > x > 0.5$, $1.1 \geq w \geq 1.0$, and $\delta$ is a number which renders the composition charge neutral.

DETAILED DESCRIPTION OF THE INVENTION

Figure 1:
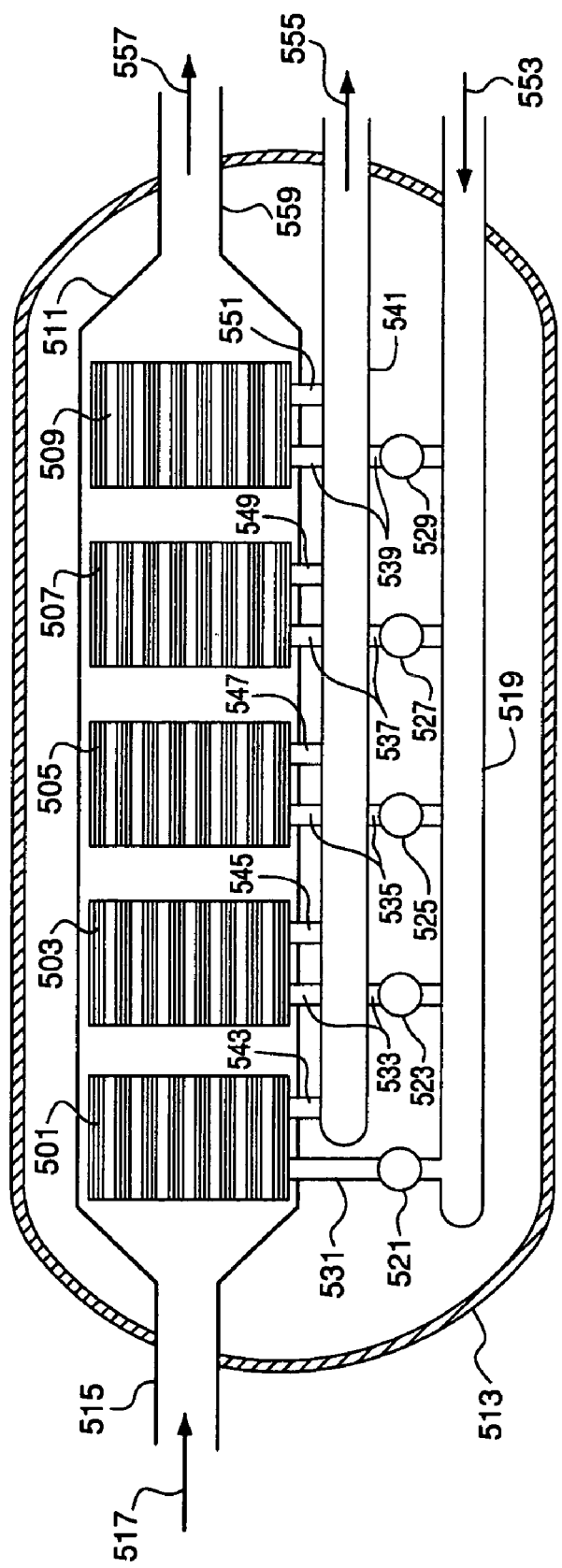
FIG. 1 illustrates an embodiment of the present invention.

In the generation of synthesis gas by ion transport membrane oxidation systems, the exposure of the system metallurgy to high temperature synthesis gas or to mixtures of steam and methane can lead to two problems. First, conventional superalloys that have the necessary mechanical properties for use at high temperatures contain silicon and in some cases contain tungsten. Under high temperature conditions at high steam partial pressures, $Si(OH)_4$ and/or $(OH)_2WO_2$ vapors form, and these vapors can react with the ion transport membrane materials. This can poison the membranes, cause reduced oxygen flux performance, and degrade the mechanical properties of the membrane. There is a need for methods to construct the reactor systems such that the metal components in contact with hot synthesis gas will not generate these contaminants while having sufficient mechanical strength at high operating temperatures to withstand high mechanical loads.

Refractory-lined pipe may be used to prevent contact of the hot synthesis gas with hot metal surfaces. However, this is not a solution to the contamination problem, because most refractories contain silicon compounds that can generate volatile $Si(OH)_4$ by contact with synthesis gas.

The second problem is that high-temperature superalloys, particularly alloys containing nickel, will catalyze the steam reforming of methane. This is an endothermic reaction that can decrease the temperature of the synthesis gas in the reactor, thereby requiring additional preheating of the feed gas to the membrane reactor system. Thus there is a need for reactor designs using metal components that do not promote the steam-methane reforming reaction prior to the membrane system.

A solution to these two problems should be economical, easily implemented, and use readily-available components. It has been found that these problems can be reduced or eliminated by lining the flow path of the feed gas and synthesis gas with a copper-containing metal. Copper does not catalyze the steam-methane reforming reaction nearly as much as the nickel present in most high-temperature superalloys. Copper also blocks the transport of volatile silicon and tungsten species from the superalloy into the synthesis gas stream, is relatively inexpensive, and is easy to form into the required shapes.

Lining of the piping and reactor internal surfaces with a copper-containing metal may be achieved by any method known in the vessel and piping metallurgical art. For low-pressure gas flow, alloy piping and vessels subject to low mechanical loads may be lined by electroplating with copper, applying copper foil, or by copper cladding. For high-pressure gas flow, the high-temperature superalloy pipe may be lined by any of these methods or may be lined with copper by hydro-forming copper tubing or pipe to the inside surface of the superalloy pipe and vessels. When the piping, vessels, and/or other parts are subject to low mechanical loads, they may be fabricated directly of copper or copper alloys.

It is not necessary to achieve an entirely seamless lining of copper-containing metal in the gas flow path, and some gaps in the lining can exist. It is only necessary to reduce the amount of exposed non-copper metal or refractory sufficiently to reduce the amount of contaminants emitted by non-copper metal or refractory into the synthesis gas stream to acceptable levels and/or to reduce the amount of reforming that occurs on the exposed non-copper metal to acceptable levels.

In the present disclosure, the noun "lining" means a layer of metal comprising copper that is in contact with, and/or adheres to, and/or is adjacent a surface of a part made of another metal. The part may be an item of process equipment such as, for example, piping, heat exchange surfaces, a vessel, an enclosure, and the like. The verbs "lined" and "lining" mean the process of applying a lining comprising copper to the surface of another metal. The generic terms "copper", "copper-containing metal", and "copper lining" include elemental copper metal as well as any copper-containing alloy that is effective in reducing to acceptable levels the amount of contaminants emitted by non-copper metal or refractory into the synthesis gas stream and/or the amount of reforming that occurs on the exposed non-copper metal.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

The copper-containing metal may be elemental copper metal, which is available in many different grades. It has been found that grades with a low oxygen content (i.e., less than about 0.0005 weight % oxygen) are particularly advantageous for surfaces in contact with hot synthesis gas at temperatures above about 374° C. Copper that contains oxygen may blister during high temperature service in synthesis gas, possibly due to diffusion of hydrogen into the copper and reaction with the oxygen to form steam. In some applications, it may be desirable to use a copper-containing alloy instead of elemental copper metal, while in other applications, elemental copper metal may be preferred. Typically, the copper content of the lining material is greater than about 99 wt %. Exemplary copper-containing alloys that may be used in embodiments of the invention include, for example, Cu—Ag and Cu—Ni alloys.

When the piping, vessels, and/or other parts are subject to low mechanical loads, any of them may be fabricated directly of elemental copper metal or copper-containing alloys having the properties described above for lining applications.

The method described above may be applied to any type of ion transport membrane synthesis gas production system. One exemplary design of an ion transport membrane synthesis gas production system is illustrated in the FIG. 1, which is a schematic side view of the interior of an exemplary membrane reactor vessel for use in oxidation processes. Membrane modules 501, 503, 505, 507, and 509 are installed in series in optional enclosure or flow containment duct 511 within pressure vessel 513. Each of these membrane modules has a plurality of stacked hollow wafers with an interior region and an exterior region. Optional flow containment duct 511 has inlet 515 to direct inlet gas stream 517 through the duct to contact the outer surfaces of the wafers in modules 501 to 509. The inlet gas stream is a reactant feed gas containing one or more components which react with oxygen at elevated temperatures wherein the inlet reactant feed gas is heated by any appropriate method (not shown) to a temperature of 600° C. to 1100° C. The pressure of the gas within duct 511 may be in the range of 0.2 to 8 MPa. An example of a reactant feed gas is a mixture of steam and natural gas wherein the natural gas comprises mostly methane with smaller amounts of light hydrocarbons. The mixture may be pre-reformed at a temperature below about 800° C. to yield a pre-reformed natural gas feed containing steam, methane, and carbon oxides. Other oxidizable reactant feed gases may include, for example, various mixtures of hydrogen, carbon monoxide, steam, methanol, ethanol, and light hydrocarbons.

The wafers of the membrane modules may comprise mixed conducting metal oxide material having the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Copper, Cr, Al, Zr, Mg, and Ga; wherein $0 \leq x \leq 1$, $0 \leq y \leq 1$, and $0.95 < w < 1.05$; and wherein δ is a number that renders the compound charge neutral. More specifically, the mixed conducting metal oxide material may have the general stoichiometric composition $(La_xCa_{1-x})_w FeO_{3-\delta}$ wherein $1.0 > x > 0.5$, $1.1 \geq w > 1.0$, and δ is a number which renders the composition charge neutral.

The gas pressure in the interior of flow containment duct 511 preferably is greater than the gas pressure in the interior of pressure vessel 513 between the inner wall of the vessel and the outer wall of flow containment duct 511. The pressure differential between the interior and the exterior of duct 511 at any point between the inlet and outlet of pressure vessel 513 preferably is maintained at a value equal to or greater than zero, wherein the pressure in the interior of the duct is equal to or greater than the pressure in the pressure vessel exterior to the duct. This may be accomplished, for example, by purging the space outside the duct with a gas at lower pressure than the process gas inside the duct; allowing flow communication between the space outside the duct and the process gas in the duct at the process gas outlet, 559; introducing a purge gas into the space outside the duct, and withdrawing the purge gas through a purge gas outlet while using pressure controllers on a purge gas outlet to maintain a lower pressure in the space outside the duct than inside the duct.

The interior regions of membrane modules 501 to 509 are in flow communication with two manifold systems, one to introduce an oxygen-containing oxidant gas into the modules and the other to withdraw oxygen-depleted oxidant gas from the modules. The first of these manifold systems comprises main inlet manifold 519, primary inlet manifolds 521, 523, 525, 527, and 529, and secondary inlet manifolds 531, 533, 535, 537, and 539. The second of these manifold systems comprises main outlet manifold 541 and primary outlet manifolds 543, 545, 547, 549, and 551.

In an alternative configuration (not shown) to the configuration shown in FIG. 1, secondary inlet manifolds 531, 533, 535, 537, and 539 may be combined with primary outlet manifolds 543, 545, 547, 549, and 551, respectively, when located within flow containment duct 511. Two manifolds may be combined by installing a first or inner conduit within a second or outer conduit wherein the first conduit provides a first manifold and the annulus between the conduits provides a second manifold. The conduits may be concentric or coaxial; alternatively, the conduits may not be concentric or coaxial and may have separate parallel or nonparallel axes.

This configuration of inner and outer conduits to provide a combined manifold function is defined herein as a nested manifold.

In this alternative configuration, gas 553 would flow through the central conduit and gas 555 would flow through the annulus of each set of these nested manifolds. The nested manifolds would transition to separate manifolds exterior to flow containment duct 511, i.e., would transition to secondary inlet manifolds 531, 533, 535, and 539 and primary outlet manifolds 543, 545, 547, 549, and 551 as shown in FIG. 1. Optionally, primary outlet manifolds 543, 545, 547, 549, and 551 may be nested within secondary inlet manifolds 531, 533, 535, 537, and 539, respectively, within flow containment duct 511. In this option, gas 555 would flow through the central conduit and gas 553 would flow through the annulus of each set of these nested manifolds. In generic terms, therefore, the secondary inlet manifolds and the primary outlet manifolds may be nested when located within flow containment duct 511, and either a secondary inlet manifold or a primary outlet manifold may be provided by the annulus.

Heated, pressurized, oxygen-containing oxidant gas 553, for example, air that has been heated by any appropriate method (not shown) to a temperature of 600 to 1100° C., enters main inlet manifold 519 and flows via primary inlet manifolds 521, 523, 525, 527, and 529 and secondary inlet manifolds 531, 533, 535, 537, and 539 to the inlets of membrane modules 501, 503, 505, 507, and 509. Oxygen from the oxidant gas in the interior regions of the membrane modules permeates the dense active membrane layers in the wafers of modules 501 to 509 and the permeated oxygen reacts with the reactive components in the exterior regions of the membrane modules. Oxygen-depleted oxidant gas exits the oulets of the interior regions of the membrane modules via primary outlet manifolds 543, 545, 547, 549, and 551 and main outlet manifold 541, and the final oxygen-depleted oxidant gas is withdrawn as gas stream 555. Outlet gas stream 557, which contains reaction products and unreacted feed components, is withdrawn from the reactor system via outlet 559.

In this exemplary embodiment, the copper lining described above is installed adjacent the interior surfaces of either or both of flow containment duct 511 and inlet 515. Advantageously, the interior surfaces of flow containment duct 511 and inlet 515 are both lined with the copper lining. Alternatively, flow containment duct 511 may be fabricated completely from copper or a copper-containing alloy when structural requirements permit. In this alternative, inlet 515 would be lined with copper or a copper alloy.

While the exemplary reactor vessel described above has a single inlet for reactant feed gas to the membrane modules, a single flow containment duct, and a single outlet from the membrane modules, other embodiments are possible in which multiple inlets, multiple flow containment ducts, and/or multiple outlets may be used. For example, a pressure vessel may have two or more flow containment ducts, each having one or more inlets and one or more outlets. Generically, when a reactor vessel is described as having an inlet and an outlet, this means that it has one or more inlets and one or more outlets. Generically, when a reactor vessel is described as having a flow containment duct, this means that it has one or more flow containment ducts. In these embodiments, the copper lining may be installed advantageously adjacent the interior surfaces of all flow containment ducts and inlets that are in contact with hot synthesis gas or hot steam-methane mixtures. Alternatively, the multiple flow containment ducts may be fabricated completely from copper or a copper-containing alloy when structural requirements permit. In this alternative, the inlets are lined with copper or a copper-containing alloy.

In an alternative embodiment, optional enclosure or flow containment duct 511 is not used, and membrane modules 501 to 509 are installed directly in the interior of pressure vessel 513. In this alternative embodiment, main inlet manifold 519, primary inlet manifolds 521, 523, 525, 527, and 529, secondary inlet manifolds 531, 533, 535, 537, and 539, main outlet manifold 541, and primary outlet manifolds 543, 545, 547, 549, and 551 may be located in the interior of the pressure vessel as shown in the FIGURE.

Some or all of these manifolds may be installed outside of the pressure vessel with appropriate piping passing through the vessel wall. In this alternative embodiment, the interior surfaces of the pressure vessel advantageously are lined with copper and the exterior surfaces of any manifolds within the pressure vessel also may be lined with copper.

In any of the embodiments described above, a feed gas preheater may be installed upstream of the reactor vessel to preheat the feed gas to a temperature in the range of 400° C. to 1100° C. The feed gas preheater has an interior surface that may be lined with a lining comprising copper, wherein the type of lining may be selected from the group consisting of electroplating, foil, cladding, tubing, and pipe.

In any of the embodiments described above, refractory material may be disposed between the lining and any of the interior surfaces of the flow containment duct and the inlet piping. Either or both of the flow containment duct and the inlet piping may be fabricated from alloys that comprise one or more elements selected from the group consisting of nickel, silicon, and tungsten.

EXAMPLE 1

Contamination of an Ion Transport Membrane by Nickel Superalloy Piping

A synthesis gas preheater was constructed from 118 feet of Haynes 230 tubing with an inside diameter of 0.33 inch. The piping was heated to 900° C., and 1129 scfh of a feed gas mixture consisting of (in vol %) 21.5% $H_2$, 24.5% $CH_4$, 5.1% $CO_2$, 2.0% CO, and 46.8% $H_2O$ at a pressure of 215 psig (15.8 bara) was fed to the preheater. An ion transport membrane was placed downstream of the preheater. The membrane was housed in a flow duct also made from Haynes 230. The flow duct fit around the outside of the membrane such that a space approximately 2.5 mm high was left between the duct and the membrane for synthesis gas flow. The membrane was initially maintained at 900° C. and a pressure of 215 psig (15.8 bara). The membrane was a two-sided flat plate membrane as described in U.S. Patent Publication 20040186018 and was 3.5 inches wide and 5 inches long. The flat plate membrane had an overall composition of $La_{1-x}Ca_xFeO_{3-d}$ where 0.95>x>0.5 and d is a number to make the compound charge neutral. Air was manifolded to flow inside the membrane through internal channels. The hot feed gas mixture flowed over the exterior of the membrane while the membrane was held at temperatures between 800 and 900° C. and pressure for 20 days. Over the course of the 20 day experiment, the flux through the membrane decreased by 25% from the initial value when measured at the same temperature and gas composition values.

At the end of the experiment, the membrane was cooled to room temperature, removed from the reactor, and examined using scanning electron microscopy and energy dispersive spectroscopy. The examination revealed that the surface of the membrane was covered with a 10 μm thick layer of a Ca—W—O phase. The W contamination likely resulted from the reaction of the steam in the synthesis gas with the W in the Haynes 230 to form the volatile species $WO_2(OH)_2$ via the reaction $$WO_3 + H_2O\ (g) = WO_2(OH)_2\ (g).$$

The $WO_2(OH)_2$ then reacted with the Ca in the membrane to form the contaminant phase. The build-up of this contaminant phase on the surface of the membrane resulted in decreasing oxygen flux with time.

EXAMPLE 2

Reduction in Contamination of an Ion Transport Membrane by Using Copper-Lined Nickel Superalloy Piping Upstream of the Membrane A synthesis gas preheater was constructed from 118 feet of Haynes 230 tubing with an inside diameter of 0.33 inch. A fully-annealed C10100 copper tube with an outer diameter of 0.3125 inch and a wall thickness of 0.017 inch was inserted inside the Haynes tube and hydroformed to the inner surface of the Haynes tube. The copper thickness after hydroforming was 0.015 inch. The piping was heated to 900° C., and 1060 scfh of a feed gas mixture consisting of (in vol %) 25.1% $H_2$, 25% $CH_4$, 5.8% $CO_2$, 0.9% CO, 1% $N_2$ and 42.2% $H_2O$ at a pressure of 223 psig (16.3 bara) was fed to the preheater. An ion transport membrane was placed downstream of the preheater, and the membrane was housed in a flow duct also lined with copper metal. The flow duct fit around the outside of the membrane, leaving a space of approximately 2.5 mm high between the duct and the membrane for the feed gas mixture to flow. The membrane was initially maintained at 900° C. and a pressure of 215 psig (15.8 bara). The membrane was a two-sided flat plate membrane as described in U.S. Patent Publication 20040186018 and was 3.5 inches wide and 5 inches long. The composition of the membrane was $La_{1-x}Ca_xFeO_{3-d}$ where $0.95 > x > 0.5$ and d is a number to make the compound charge neutral. Air was manifolded to flow inside the membrane through internal channels and the hot feed gas flowed over the exterior of the membrane. The membrane was held at temperature between 800 and 900° C. and 215 psia pressure for 50 days. Over the course of the 50-day experiment, the flux through the membrane did not change measurably from the initial value when measured at the same temperature and gas composition values.

At the end of the experiment, the membrane was cooled to room temperature, removed from the reactor, and examined using scanning electron microscopy and energy dispersive spectroscopy. No evidence of any W was found on the surface of the membrane. The copper lining of the hot synthesis gas flow path had completely prevented significant quantities of volatile tungsten species from entering the synthesis gas stream and reacting with the membrane.

EXAMPLE 3

Reforming of Synthesis Gas on Nickel Superalloy Piping

A synthesis gas preheater was constructed from 118 feet of Haynes 230 tubing with an inside diameter of 0.33 inch. The piping was heated to 900° C. and 1129 scfh of a feed gas mixture consisting of (in vol %) 21.5% $H_2$, 24.5% $CH_4$, 5.1% $CO_2$, 2.0% CO and 46.8% $H_2O$ at a pressure of 215 psig (15.8 bara) was fed to the preheater. On a dry basis the gas composition was (in vol %) 40.5% $H_2$, 46.2% $CH_4$, 9.6% $CO_2$ and 3.8% CO. The composition of the gas exiting the preheater was measured using a gas chromatograph and the exit gas composition on a dry basis was (in vol %) 70% $H_2$, 6% $CH_4$, 8.1% $CO_2$ and 14.9% CO. Most of the methane in the feed had been converted to CO and $CO_2$ via the steam methane reforming reaction, and the gas had nearly reached reforming equilibrium at the given conditions.

EXAMPLE 4

Reduction of Reforming of Synthesis Gas by Using Copper-Lined Nickel Superalloy Piping A synthesis gas preheater was constructed from 118 feet of Haynes 230 tubing with an inside diameter of 0.33 inch. A fully annealed C10100 copper tube with an outer diameter of 0.3125 inch and a wall thickness of 0.017 inch was inserted inside the Haynes tube and hydroformed to the inner surface of the Haynes tube. The copper thickness after hydroforming was 0.015 inch. The piping was heated to 900° C., and 1060 scfh of a gas mixture consisting of (in vol %) 25.1% $H_2$, 25% $CH_4$, 5.8% $CO_2$, 0.9% CO, 1% $N_2$ and 42.2% $H_2O$ at a pressure of 223 psig (16.3 bara) was fed to the preheater. On a dry basis, the gas composition was (in vol %) 43.4% $H_2$, 43.2% $CH_4$, 10.1% $CO_2$, 1.7% $N_2$ and 1.6% CO. The composition of the gas exiting the preheater was measured using a gas chromatograph, and the exit gas composition on a dry basis was (in vol %) 43.0% $H_2$, 43.0% $CH_4$, 9.1% $CO_2$, 1.1% $N_2$ and 3.3% CO. A negligible amount of the methane was consumed by the steam methane reforming reaction. The copper lining effectively stopped the reforming reaction from occurring.

EXAMPLE 5

Measurement of Reforming on Haynes 230 Tubing

A group of Haynes 230 tubes with dimensions of 8½ inch OD×0.083 inch wall thickness×6 inches long was bundled and used to measure the amount of reforming that occurred on the tubing. The bundle was placed in a high pressure reactor, and a gas mixture consisting of (in vol %) 23.6% $H_2$, 23.8% $CH_4$, 5.0% $CO_2$, 1.9% CO, 1.1% $N_2$, and 44.6% $H_2O$ at a temperature of 850° C. and a pressure of 29.5 bara was fed to the bundle of tubes by manifolding such that the flow went through the inside of the tubes in parallel. The composition of the gas exiting the bundle was measured using gas chromatography, and it was observed that 19.3% of the methane in the feed gas was converted under these conditions. By comparison, the expected conversion at equilibrium was 51.4%.

EXAMPLE 6

Measurement of Reforming on Copper-Plated Haynes 230 Tubes

A group of Haynes 230 tubes with dimensions of 8½ inch OD×0.083 inch wall thickness×6 inches long was bundled and coated with copper using electroplating to achieve a copper coating with a thickness of approximately 0.015-0.020 inch. These copper-plated tubes were used to measure the amount of reforming that occurred on the tubing. The bundle was placed in a high pressure reactor and a feed gas mixture consisting of (in vol %) 23.6% $H_2$, 23.8% $CH_4$, 5.0% $CO_2$, 1.9% CO, 1.1% $N_2$, and 44.6% $H_2O$ at a temperature of 850° C. and a pressure of 29.5 bara was fed to the bundle of tubes. The feed gas mixture was manifolded such that the flow went through the inside of the tubes in parallel. The composition of the gas exiting the bundle was measured using gas chromatography, and it was observed that only 9.5% of the methane was converted under these conditions. Therefore, the copper plating significantly reduced the amount of reforming that occurred on the tubes compared with the uncoated tubes of Example 5.

The invention claimed is:

1. An ion transport membrane oxidation system comprising
   (a) an enclosure having an interior and an interior surface, inlet piping having an internal surface and adapted to introduce a heated feed gas into the interior of the enclosure, and outlet piping adapted to withdraw a synthesis gas product from the interior of the enclosure;
   (b) one or more planar ion transport membrane modules disposed in the interior of the enclosure, each membrane module comprising mixed metal oxide material; and
   (c) a preheater adapted to heat a feed gas to provide the heated feed gas to the inlet piping of the enclosure, wherein the enclosure is adapted to place the heated feed gas in contact with the mixed metal oxide material, and wherein the preheater comprises an interior surface;
   wherein either
   (1) any of the interior surfaces of the enclosure, the inlet piping, and the preheater are lined with a copper-containing metal lining, or
   (2) any of the interior surfaces of the inlet piping and the preheater are lined with a copper-containing metal lining, and the enclosure comprises copper.

2. The system of claim 1 wherein each membrane module has an interior region and an exterior region, and wherein the inlet and the outlet of the enclosure are in flow communication with the exterior region of each membrane module.

3. The system of claim 1 wherein the copper-containing metal lining comprises greater than about 99 weight % copper.

4. The system of claim 1 wherein the copper-containing metal lining comprises less than about 0.0005 weight % oxygen.

5. The system of claim 1 wherein the type of copper-containing metal lining is selected from the group consisting of electroplating, foil, cladding, tubing, and pipe.

6. The system of claim 1 further comprising refractory material disposed between the copper-containing metal lining and any of the interior surfaces of the enclosure and the inlet piping.

7. The system of claim 1 wherein any of the enclosure, the inlet piping, and the preheater comprise one or more elements selected from the group consisting of nickel, silicon, and tungsten.

8. The system of claim 1 wherein the enclosure is a flow containment duct that surrounds the one or more planar ion transport membrane modules and wherein the flow containment duct is disposed in the interior of a pressure vessel.

9. The system of claim 1 wherein the enclosure is a pressure vessel that surrounds the one or more planar ion transport membrane.

10. The system of claim 1 wherein the mixed conducting metal oxide material has the general stoichiometric composition $(Ln_{1-x}A_x)_w(B_{1-y}B'_y)O_{3-\square}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Copper, Cr, Al, Zr, Mg, and Ga; wherein $0 \leq x \leq 1$, and $0.95 < w < 1.05$; and wherein $\square$ is a number that renders the compound charge neutral.

11. The method of claim 10 wherein the mixed conducting metal oxide material has the general stoichiometric composition $(La_xCa_{1-x})_w FeO_{3-\delta}$ wherein $1.0 > x > 0.5$, $1.1 \geq w \geq 1.0$, and $\delta$ is a number which renders the composition charge neutral.

12. A process for generating synthesis gas comprising
   (a) providing an ion transport membrane oxidation system including
      (1) an enclosure having an interior and an interior surface, inlet piping having an internal surface and adapted to introduce a heated feed gas into the interior of the enclosure, outlet piping adapted to withdraw a product gas from the interior of the enclosure, and a preheater adapted to heat a feed gas to provide the heated feed gas to the inlet piping of the enclosure, wherein the preheater has an interior surface; and
      (2) one or more planar ion transport membrane modules disposed in the interior of the enclosure, each membrane module comprising mixed metal oxide material;
   wherein either
      (3) any of the interior surfaces of the enclosure, the inlet piping, and the preheater are lined with a copper-containing metal lining, or
      (4) any of the interior surfaces of the inlet piping and the preheater are lined with a copper-containing metal lining, and the enclosure comprises copper.
   (b) introducing a heated oxygen-containing gas into the interior region of each membrane module, introducing a hydrocarbon-containing feed gas into the preheater, withdrawing a preheated hydrocarbon-containing feed gas from the preheater, and introducing the preheated hydrocarbon-containing feed gas into the exterior region of each membrane module; and
   (c) withdrawing a synthesis gas product from the interior of the enclosure via the outlet piping.

13. The process of claim 12 wherein the hydrocarbon-containing feed gas comprises at least methane and water and optionally comprises any of hydrogen, carbon monoxide, and carbon dioxide.

14. The process of claim 12 wherein the hydrocarbon-containing feed gas is pre-reformed natural gas.

15. The process of claim 12 wherein the feed gas is heated in the feed gas preheater to a temperature in the range of 600 to 1100° C.

16. The process of claim 12 wherein the synthesis gas comprises at least hydrogen, carbon monoxide, and carbon dioxide.

17. The process of claim 12 wherein the copper-containing metal lining comprises greater than about 99 weight % copper.

18. The process of claim 12 wherein the copper-containing metal lining comprises less than about 0.0005 weight % oxygen.

19. The process of claim 12 wherein the type of copper-containing metal lining is selected from the group consisting of electroplating, foil, cladding, tubing, and pipe.

20. The process of claim 12 further comprising refractory material disposed between the copper-containing metal lining and any of the interior surfaces of the enclosure and the inlet piping.

21. The process of claim 12 wherein any of the vessel, the inlet piping, and the preheater comprise one or more elements selected from the group consisting of nickel, silicon, and tungsten.

22. The process of claim 12 wherein the enclosure is a flow containment duct that surrounds the one or more planar ion transport membrane modules and wherein the flow containment duct is disposed in the interior of a pressure vessel.

23. The process of claim 12 wherein the enclosure is a pressure vessel that surrounds the one or more planar ion transport membrane modules.

24. The process of claim 12 wherein the mixed conducting metal oxide material has the general stoichiometric composition $(Ln_{1-x}A_x)_w(B_{1-y}B'_y)O_{3-\square}$, wherein Ln represents one or more elements selected from La, the D block lanthanides of the IUPAC periodic table and Y; wherein A represents one or more elements selected from Mg, Ca, Sr and Ba; wherein B and B' each represent one or more elements selected from Sc, Ti, V, Mn, Fe, Co, Ni, Copper, Cr, Al, Zr, Mg, and Ga; wherein $0 \leqq x \leqq 1$, and $0.95 < w < 1.05$; and wherein $\square$ is a number that renders the compound charge neutral.

25. The process of claim 24 wherein the mixed conducting metal oxide material has the general stoichiometric composition $(La_xCa_{1-x})_w FeO_{3-\delta}$ wherein $1.0 > x > 0.5$ $1.1 \geqq w \geqq 1.0$ and $\delta$ is a number which renders the composition charge neutral.

* * * * *

UNITED STATES PATENT AND TRADEMARK OFFICE
CERTIFICATE OF CORRECTION

PATENT NO. : 7,556,675 B2
APPLICATION NO. : 11/247504
DATED : July 7, 2009
INVENTOR(S) : Michael Francis Carolan, Eric Minford and William Emil Waldron It is certified that error appears in the above-identified patent and that said Letters Patent is hereby corrected as shown below:

Column 12, Line 2

In claim 10 insert -- $0 \leq y \leq 1$, -- after the formula $0 \leq x \leq 1$, Column 14, Line 6

In claim 24, insert -- $0 \leq y \leq 1$, -- after the formula $0 \leq x \leq 1$, Signed and Sealed this First Day of September, 2009

David J. Kappos
*Director of the United States Patent and Trademark Office*